United States Patent
Hackler, Sr. et al.

(10) Patent No.: US 9,733,428 B2
(45) Date of Patent: Aug. 15, 2017

(54) FLEXIBLE 3-D PHOTONIC DEVICE

(71) Applicants: Douglas R. Hackler, Sr., Boise, ID (US); Dale G. Wilson, Kuna, ID (US)

(72) Inventors: Douglas R. Hackler, Sr., Boise, ID (US); Dale G. Wilson, Kuna, ID (US)

(73) Assignee: American Semiconductor, Inc., Boise, ID (US)

( * ) Notice: Subject to any disclaimer, the term of this patent is extended or adjusted under 35 U.S.C. 154(b) by 5 days.

(21) Appl. No.: 14/172,724

(22) Filed: Feb. 4, 2014

(65) Prior Publication Data

US 2014/0219604 A1 Aug. 7, 2014

Related U.S. Application Data

(60) Provisional application No. 61/760,350, filed on Feb. 4, 2013.

(51) Int. Cl.
*G02B 6/122* (2006.01)
*G02B 6/13* (2006.01)
*G02B 6/12* (2006.01)

(52) U.S. Cl.
CPC .............. *G02B 6/122* (2013.01); *G02B 6/13* (2013.01); *G02B 6/1221* (2013.01); *G02B 2006/12061* (2013.01)

(58) Field of Classification Search
None
See application file for complete search history.

(56) References Cited

U.S. PATENT DOCUMENTS 6,027,958 A * 2/2000 Vu .............. H01L 21/568
257/679
7,248,772 B2 7/2007 Suzuki et al.
(Continued)

FOREIGN PATENT DOCUMENTS

WO WO 2008/098404 A2 * 8/2008

OTHER PUBLICATIONS

A. Ghaffari et al. Transfer of micro and nano-photonic silicon nanomembrane waveguide devices on flexible substrates. Optics Express, 18:19:20086-20095, Sep. 13, 2010.*
(Continued)

*Primary Examiner* — Mike Stahl
(74) *Attorney, Agent, or Firm* — Your Intellectual Property Matters, LLC; Robert A. Frohwerk

(57) ABSTRACT

Three-dimensional flexible photonic integrated circuits on silicon are fabricated in semiconductor wafer form and then transferred to Silicon-on-Polymer (SOP) substrates. SOP provides flexibility for conformal mounting with devices capable of maintaining performance when dynamically deformed to allow routing of light in x, y and z directions. Bonding a wafer or individual die of III-V semiconductor, such as Gallium Arsenide or similar photonic material, to the flexible silicon creates an active region for lasers, amplifiers, modulators, and other photonic devices using standard processing. Mounting additional photonic devices to the opposite side of a flexible photonic waveguide produces a stack for three-dimensional devices. Multiple flexible photonic waveguides may be stacked to increase functionality by transferring light between stacked waveguides. The flexible photonic circuit allows for integration of photonic devices such as low threshold lasers, tunable lasers, and other photonic integrated circuits with flexible Complementary Metal Oxide Semiconductor (CMOS) integrated circuits.

13 Claims, 3 Drawing Sheets

(56) References Cited

U.S. PATENT DOCUMENTS

| | | |
|---|---|---|
| 8,110,823 B2 | 2/2012 | Bowers |
| 9,082,881 B1* | 7/2015 | Hackler, Sr. et al. |
| 2004/0102020 A1* | 5/2004 | Roberds ............ H01L 21/76254 438/455 |
| 2013/0201485 A1* | 8/2013 | Rubio-Guivernau ......... G01B 9/02091 356/479 |
| 2014/0234995 A1* | 8/2014 | Li .......................... H01L 33/00 438/22 |

OTHER PUBLICATIONS

Written opinion for PCT/US2014/014740, dated Sep. 2, 2014.*

* cited by examiner

FLEXIBLE 3-D PHOTONIC DEVICE

CROSS-REFERENCES TO RELATED APPLICATIONS

Not applicable

FIELD OF THE INVENTION

The present invention relates generally to optical waveguides. In particular, the described devices are produced by standard semiconductor processing techniques on a flexible substrate.

BRIEF SUMMARY OF THE INVENTION

Present day photonic waveguides fabricated using semiconductor wafers are limited to routing light in two dimensions, that is, in x and y directions, within the plane of rigid crystalline silicon. By fabricating waveguides in a semiconductor wafer form and then converting those wafers to Semiconductor-on-Polymer (SOP), the waveguides can provide routing for light in x, y and z directions. The SOP format provides for sub-micron sized features that are flexible for conformal mounting or capable of maintaining performance while being deformed dynamically. The result is a fully flexible sub-micron feature-capable waveguide.

Bonding a wafer or individual die from a III-V (GaAs, Gallium Arsenide, for instance) semiconductor (or similar photonic material) on to the flexible silicon prior to demount can create an active region for lasers, amplifiers, modulators, and other photonic devices using standard processing techniques on the pre-demount flexible substrates. Following demount, additional photonic devices may be mounted to the opposite side of flexible photonic waveguide structure for 3-D device stacking. Alternatively, multiple flexible photonic waveguides may be stacked to increase functionality with light transfer occurring between the stacked waveguides. The flexible photonic circuit allows for integration of photonic devices such as low threshold lasers, tunable lasers, and other photonic integrated circuits with flexible Complementary Metal Oxide Semiconductor (CMOS) integrated circuits.

BRIEF DESCRIPTION OF THE DRAWINGS

The particular features and advantages of the invention will become apparent from the following description taken in conjunction with one or more of the accompanying FIGS. 1-5 of the drawings.

The following Reference Numbers may be used in conjunction with one or more of the accompanying FIGS. 1-5 of the drawings:

210 substrate, rigid, for 2-D waveguide;
220 waveguide, rigid, 2-D;
230 waveguide, 3-D, on flexible substrate, convex;
240 waveguide, 3-D, on flexible substrate, concave;
250 buried oxide (BOX);
260 handle silicon;
270 passivation;
280 waveguide, SOI (Silicon-on-Insulator); and
290, 295 polymer.

DETAILED DESCRIPTION OF THE INVENTION

Ultra-small geometrical silicon photonic structures have been demonstrated as photonic waveguides. Integration of these waveguides with microelectronics provides a highly integrated platform for electronic-photonic convergence. The practical achievement of this platform requires reduction of such factors as the propagation and coupling losses in the interface to external fibers. State-of-the-art technologies specially tuned to the fabrication of nanometer structures, and the fundamental propagation performance has already become a practical standard. Some passive devices, such as branches and wavelength filters, and dynamic devices based on the thermo-optic effect or carrier plasma effect have been developed by using silicon photonic wire waveguides. These waveguides also offer an efficient media for nonlinear optical functions, such as wavelength conversion. Although polarization dependence remains a serious obstacle to the practical applications of these waveguides, waveguide-based polarization manipulation devices provide effective solutions, such as a polarization diversity system.

Bonding a wafer, individual die, or SoP device from a III-V semiconductor, such as GaAs (Gallium Arsenide) or similar photonic material, onto the flexible silicon prior to demount can create an active region for lasers, amplifiers, modulators, and other photonic devices using standard processing techniques on the pre-demount flexible substrates. Following demount, additional photonic devices may be mounted to the opposite side of a flexible photonic waveguide structure for stacking of devices in three dimensions (3-D).

Waveguides are an essential component of photonic circuits. The presently described devices are flexible silicon strip photonic waveguides routed in silicon to create interconnects and couplers. These are photonic structures having sub-micron features that are integrated with CMOS (Complementary Metal Oxide Semiconductor). Single crystalline silicon structures are well known by those skilled in these arts to be effective for photonic waveguides.

Figure 1:
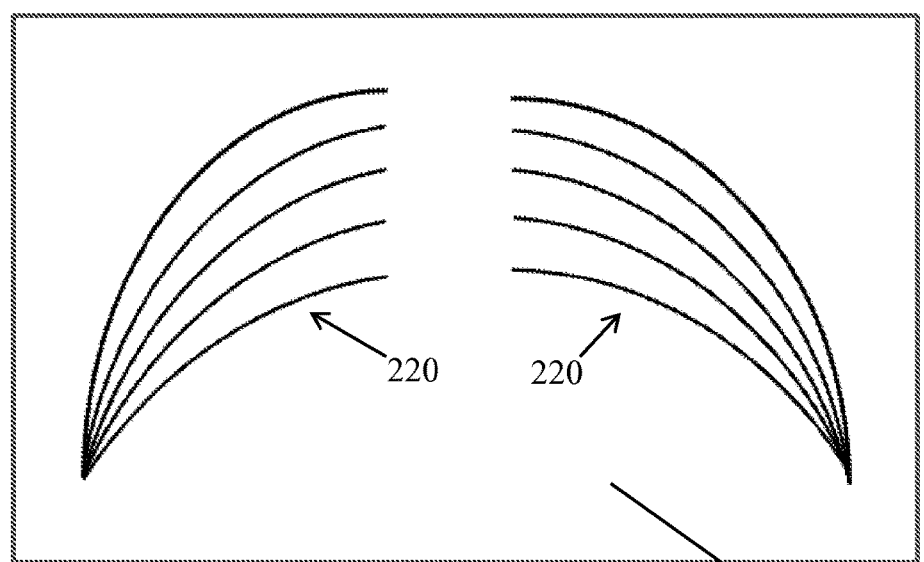
FIG. 1 shows a pair of 2-D Photonic Waveguides on a rigid substrate.
Figure 2:
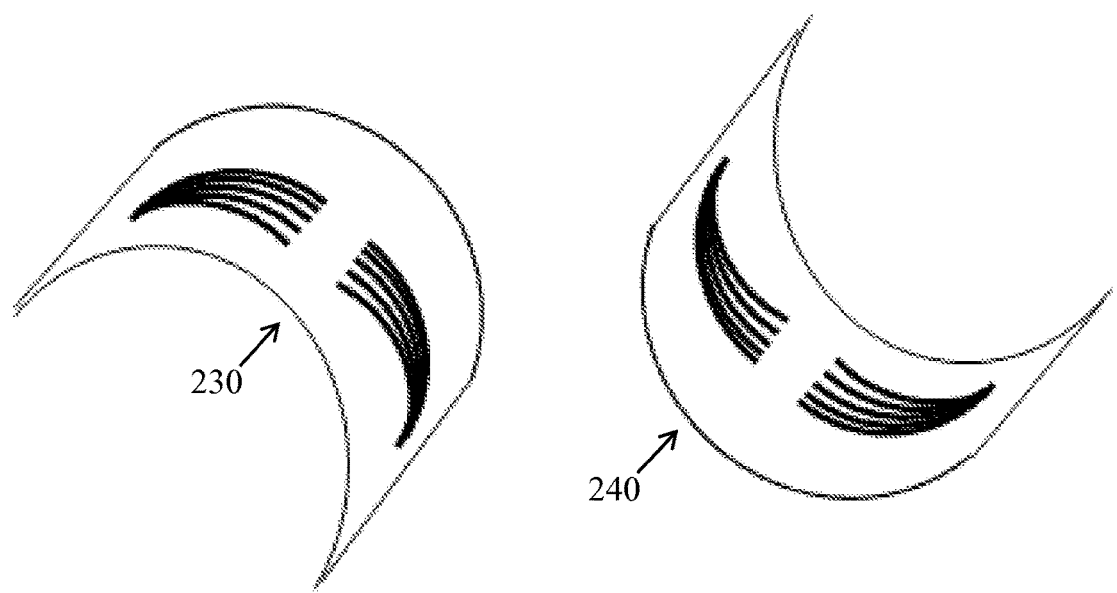
FIG. 2 shows two pair of 3-D Photonic Flexible Waveguides on polymer substrates, one as concave and one as convex.

Current structures utilize rigid wafer semiconductor substrates where the waveguides can be routed in the two-dimensional plane of the crystalline silicon, as depicted in waveguides 220 of FIG. 1. Implementing photonic devices using a Semiconductor-on-Polymer (SOP) process that has been developed for flexible CMOS results, as depicted in FIG. 2, in flexible single crystalline silicon structures that can be deformed into the third dimension. Such fabrication of photonic waveguides (230, 240) results in photonic devices that are flexible and provide for the routing of light in three dimensions.

In a Silicon-on-Polymer (SOP) process, such as that described in U.S. Pat. No. 6,762,510 entitled "Flexible Integrated Monolithic Circuit" issued to Fock et al., a semiconductor wafer, such as one upon which CMOS circuitry has been fabricated, is coated with a polymer. The polymer conforms well to the CMOS circuitry and is cured to a solid. A carrier substrate is then temporarily bonded to the polymer. This carrier is used as support of the intermediate assembly while the original CMOS substrate, that is, the handle silicon, is removed by processes that may include grinding and etching in order to reduce the original substrate to less than about 12 μm. While still supported by the carrier substrate, additional devices may be fabricated, including complex integrated active devices, passive devices and interconnects. The ultra-thin substrate with its CMOS devices intact is then released from the carrier substrate by breaking its temporary bond to the polymer. This results in a flexible integrated circuit in a SOP format.

Three-dimensional waveguides can be patterned in situ with silicon mesa isolation. Other photonic material can integrated into the semiconductor wafer prior to the SOP processing. When used in conjunction with the SOP process, such waveguides can be fabricated simultaneously with flexible CMOS so that the resultant integrated circuits and waveguides are both flexible. Devices fabricated using III-V materials, such as Gallium Arsenide (GaAs), and other photonic materials are bonded to the photonic circuits for the integration of lasers and diodes. These devices can be bonded to the waveguides while they are either still mounted on their original rigid carrier wafer or after they have been demounted from the wafer. The devices can either be thinned to the point of flexibility or be made small enough so that they can be surface-mounted to the SOP waveguides without impeding the flexibility of the SOP wafer. Integration with CMOS provides ready connectivity to electronic inputs and outputs. SOP processing results in flexible single crystalline photonic III-V and Silicon materials.

Other embodiments of such integration include alternative semiconductor technologies such as GaN (gallium nitride), nanotubes, graphene, ferroelectric, magnetic memory, and chalcogenide. These and other late FEOL (Front End-of-Line) process options are applied as part of the photonic circuit, contributing to electronic or photonic functions.

The characteristic flexibility of the described devices enables these photonic waveguides to conform to a variety of radii. They are not affected adversely by deformation during storage, and they are physically robust, resisting damage from being dropped or other impact. The described design is adaptable to heatsinks, external device interconnects, high-temperature flexible materials other than SOP polymer, and claddings on the external surfaces of the semiconductor waveguides.

Figure 3:
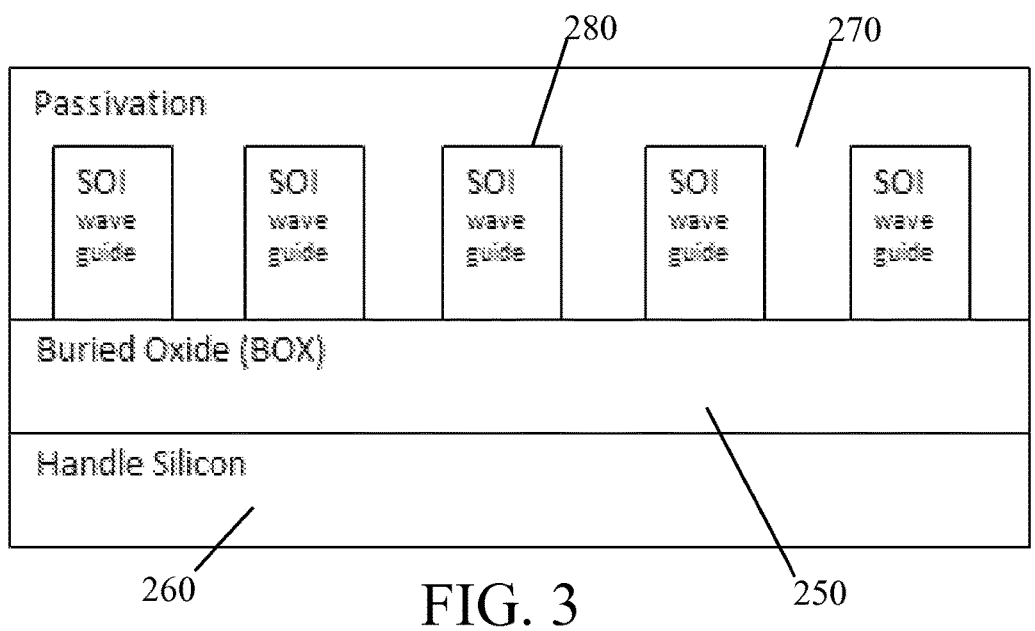
FIG. 3 depicts traditional 2-D Photonic Waveguides fabricated in SOI (Semiconductor-On-Insulator)
Figure 4:
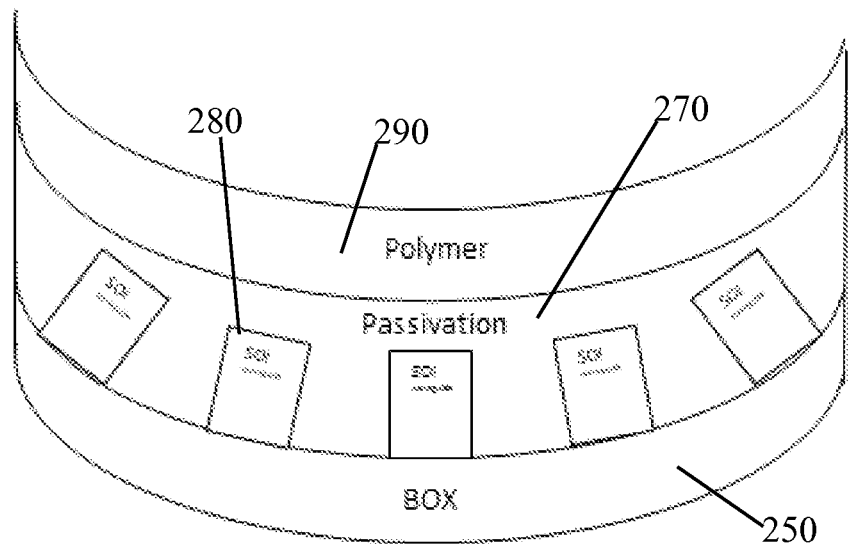
FIG. 4 illustrates a 3-D Flexible Waveguide fabricated in SOP as a concave flexible structure.

A traditional two-dimensional photonic waveguide fabricated in SOI (Semiconductor-On-Insulator) is depicted in FIG. 3. The photonic circuits and SOI waveguides 280 are fabricated using conventional methods on a buried oxide (BOX, 250) supported by handle silicon 260. This is protected by a passivation layer 270 resulting in a rigid two-dimensional device.

Unlike the traditional two-dimensional photonic waveguide depicted in FIG. 3, the photonic circuits described here may be mounted to conform to concave or convex surfaces depending upon a variety of applications and the environment in which they are to be stored and used. This capability to conform is enabled by removal of the rigid handle silicon 260 (FIG. 3).

The flexible photonic waveguide under present consideration is built upon a sub-micron single crystalline SOP layer supported by a flexible semiconductor substrate with an intervening isolation layer. Passivation of the SOP provides an additional isolation layer effectively cladding the waveguide to confine light within the SOP. The isolation material may be any substance that supports confinement of the optical mode, such as silicon dioxide or silicon nitride.

Figure 5:
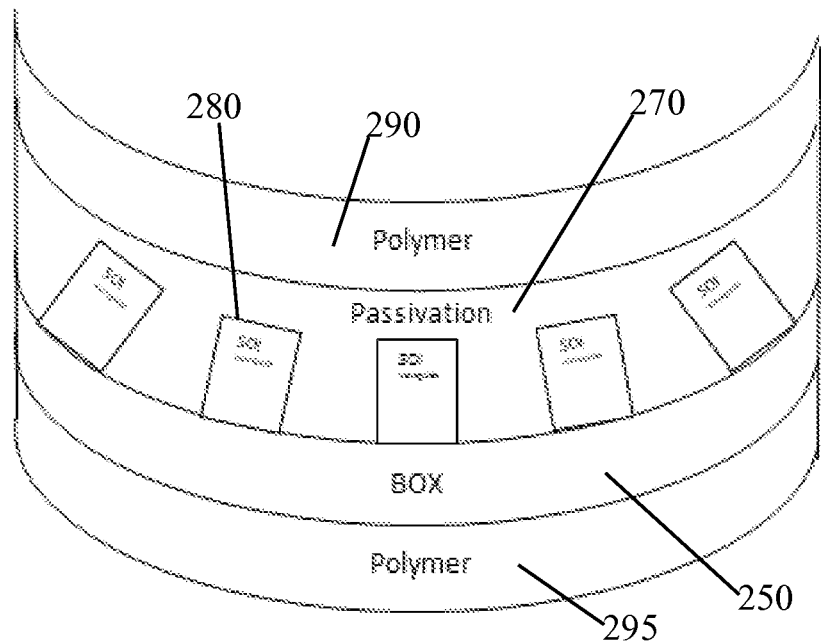
FIG. 5 illustrates a 3-D Flexible Waveguide fabricated in SOP with a backside polymer.

A polymer layer 290 is applied to the passivated surface of the IC for support while the handle silicon 260 is removed (FIG. 4) and replaced by a flexible backside polymer 295 (FIG. 5). The result is a flexible photonic waveguide completely encapsulated in a polymer coating. These waveguide assemblies may be reshaped dynamically as part of a tuning mechanism, including control by electronic circuits, or they may be simply adjusted to conform to various environmental conditions. They may be controlled by electronic circuits through control elements such as MEMS (Micro-Electro-Mechanical System) mirrors, PIN diodes and other similar devices to route, amplify or delay photonic signals.

Since their flexibility is a consequence of having been constructed on a polymer substrate, wherein the handle wafer, whether silicon or another material, has been removed, these devices are inherently thin. This offers a benefit of reduced propagation losses. In general, single crystalline materials enable high mobility electronics and high performance photonics.

Their thinness also allows these devices to be stacked, enabling construction of waveguides and other complex structures capable of routing signals in three dimensions, since photonic devices may be mounted to opposite sides of a flexible photonic waveguide structure. Alternatively, multiple flexible photonic waveguides may be stacked to increase functionality with light transfer occurring between the stacked waveguides. Waveguides within a stack may be optically coupled or they may be optically isolated. The flexible photonic circuit allows for integration of photonic devices such as low threshold lasers, tunable lasers, and other photonic integrated circuits with flexible Complementary Metal Oxide Semiconductor (CMOS) integrated circuits. Multiple layers allow for highly complex systems with interconnects and devices, active or passive, fabricated within the layers prior to being stacked.

Significant benefits are gained by the merger of silicon and III-V semiconductor devices into flexible waveguides. Silicon is used to produce well understood waveguides, whereas III-V devices are integrated to generate, amplify and modulate light for the waveguides. Other photonic materials may be integrated to affect the propagation or other characteristics of the light. CMOS devices convert the processed light into electronic signals and stimulate the III-V materials. Construction of all of this on a SOP substrate provides a complete photonic circuit with the flexibility to route light in three dimensions.

It will be recognized by those skilled in these arts that many variations of the described embodiments are possible. Although silicon is the most likely material for constructing the photonic waveguides, any single crystalline wafer material is a feasible candidate. Furthermore, deposited materials such as TEOS (Tetra-Ethyl-Ortho-Silicate), polysilicon, amorphous silicon, silicon nitride, silicon carbide, gallium nitride or others may be used. Additional usable materials include graphene, nanotubes and non-crystalline materials. Each of these would still benefit from the flexibility afforded by sub-micron features. The essence of the presently described method is the fabrication of waveguides in wafer form and their subsequent conversion to flexible SOP.

What is claimed is:
1. A flexible photonic device, comprising:
a flexible polymer substrate;
a first layer of isolation material directly on the flexible polymer substrate;
a photonic circuit layer on the first layer of isolation material, wherein the photonic circuit layer comprises at least one photonic waveguide formed from a single-crystalline semiconductor; and a second layer of isolation material on the photonic circuit layer, wherein the first layer of isolation material and the second layer of isolation material do not comprise a polymer.

2. The flexible photonic device of claim 1, wherein the flexible photonic device is flexible to conform to a non-planar mounting surface.

3. The flexible photonic device of claim 1, wherein the photonic circuit layer includes photonic circuitry, and the photonic circuitry is functional during flexure or other deformation into a non-planar configuration.

4. The flexible photonic device of claim 1, wherein the isolation material of the first layer and of the second layer is a substance that supports confinement of an optical mode.

5. The flexible photonic device of claim 1, wherein a total thickness of the flexible photonic device does not exceed 50 µm.

6. The flexible photonic device of claim 1, wherein two or more of the flexible photonic device are placed one upon another to form a stack of flexible photonic waveguides.

7. The stack of claim 6, wherein at least one of the two or more of the flexible photonic device is optically coupled to another of the two or more of the flexible photonic device.

8. The stack of claim 6, wherein at least one of the two or more of the flexible photonic device is optically isolated from each other of the two or more of the flexible photonic device.

9. A method of forming a flexible photonic device, comprising:

providing a base including a semiconductor substrate and an isolation layer on the semiconductor substrate;

preparing a photonic circuit on the isolation layer, wherein the photonic circuit comprises at least one photonic waveguide formed from a semiconductor;

removing the semiconductor substrate; and transferring the photonic circuit to a flexible polymer support following the step of removing.

10. A method of forming a flexible photonic device, comprising:

providing a base including a semiconductor substrate and an isolation layer on the semiconductor substrate;

preparing a photonic circuit on the isolation layer, wherein the photonic circuit comprises at least one photonic waveguide formed from a semiconductor;

removing the semiconductor substrate; and then replacing the semiconductor substrate by a flexible polymer support.

11. The flexible photonic device of claim 4, wherein the isolation material is silicon dioxide.

12. The flexible photonic device of claim 4, wherein the isolation material is silicon nitride.

13. A method of forming a flexible photonic device, wherein the steps of claim 10 are performed in a Semiconductor-On-Polymer process.

* * * * *